United States Patent Office.

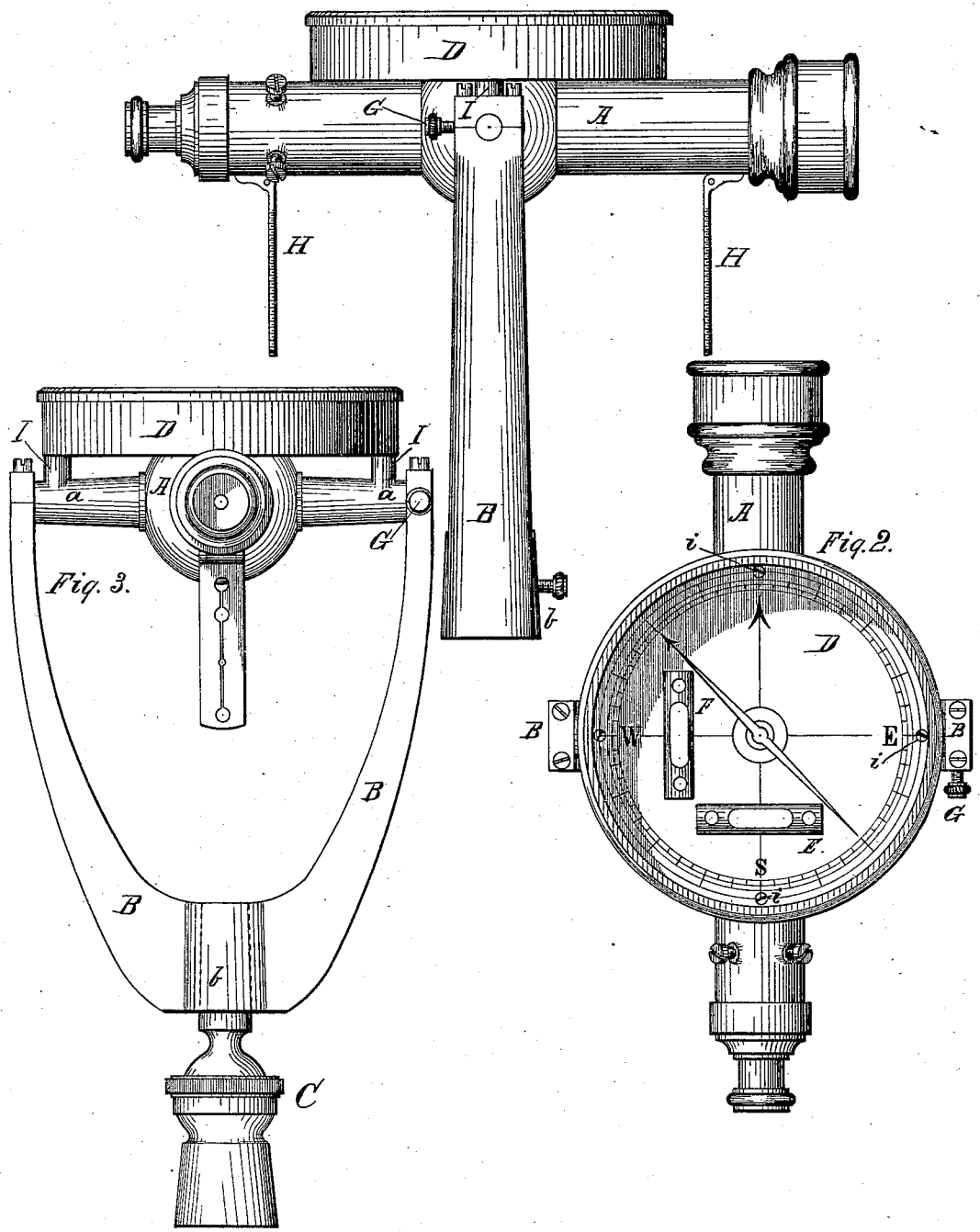

ARTHUR W. ELKINS, OF SHERBROOKE, QUEBEC, CANADA.

TRANSIT-COMPASS.

SPECIFICATION forming part of Letters Patent No. 253,856, dated February 21, 1882.

Application filed October 14, 1881. (No model.)

*To all whom it may concern:*

Be it known that I, ARTHUR W. ELKINS, a citizen of the Dominion of Canada, residing at Sherbrooke, in the county of Sherbrooke and Province of Quebec, have invented certain new and useful Improvements in Surveying and Engineering Instruments; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

My invention relates to improvements in transit-compasses.

It is a well-known fact among civil engineers, surveyors, &c., that it is a difficult if not an impossible task to obtain a straight line over a hilly district with the ordinary plain sight-compass, while on the other hand the transit-compass ordinarily used to accomplish such object is so complicated and delicate in structure as to require extreme care in handling and arranging same, and if slightly damaged by accident or otherwise requires special tools and skill in repairing such damage. Besides, these instruments are so costly and of such bulk and weight as to be generally disapproved, and found very unwieldy where long surveys are made in unsettled districts.

I am aware that it is not new to combine the telescope with the compass by rigidly attaching the latter beneath the former in such a manner that the needle is partly hidden by the telescope. This is objectionable for the reason that the operator in adjusting his instrument is obliged to peer beneath the telescope to see if the needle and telescope are parallel, and then look at the levels upon the top of the instrument to note the plane upon which the device is set. There are also great objections to the ordinary manner of attaching the levels to the instrument, owing to the liability of the glass inclosing the spirit being broken and of their being broken off the device.

The object of my invention is to overcome these objections, and to combine in a light, compact, and cheap instrument the simplicity of the ordinary plain sight-compass and the capabilities of the expensive and complicated transit-compass.

To this end my invention consists of the parts, substantially as hereinafter described, and particularly pointed out in the claims.

Referring to the drawings, Figure 1 is a side elevation of my improved transit-compass. Fig. 2 is a plan view of the same, and Fig. 3 is an end elevation thereof.

Corresponding parts in the several figures are indicated by similar letters of reference.

In the annexed drawings, A marks a telescope, of a construction similar to those ordinarily used in surveyors' transit-instruments, and provided with trunnions $a$, secured in bearings in the ends of a bifurcated holder, B, which is provided with a socket, $b$, to receive the upper arm of a staff, C, provided with a ball-and-socket joint. The ordinary tripod may be substituted for the staff.

Detachably secured to the upper side of the telescope, parallel with it and its axis, is a compass, D, which may be of the kind used in plain sight-compasses, and having its north and south points parallel with and perpendicularly over the line of sight through the telescope.

Arranged within the compass, and capable of being seen through its glass cover, is a level, E, disposed at right angles to the line of collimation and parallel with the axis of the telescope, the purpose of which is to indicate when the compass and telescope are level in the line of the axis of the latter. The ball-and-socket joint in the staff permits this lateral movement to obtain the result desired.

F marks a second level, arranged in the compass at right angles to the level E and parallel with the line of sight, to indicate when the compass and telescope are level in the direction of the length of the latter. By placing these levels beneath the glass of the compass-box the danger of their being broken is greatly lessened and the liability of their being broken from the instrument entirely obviated. The advantage of having the compass and levels together in the same box is obvious.

G marks a set-screw placed in one of the arms of the bifurcated holder, to engage, when it is desired, with one of the trunnions $a$ of the telescope to hold the latter at any desired angle. This is especially designed to hold the telescope level when making surveys for railroads in ascertaining the grade or differences of level.

Hinged to and depending from the under surface of the telescope A is a pair of sights, H, of the ordinary construction, and so arranged that the plane indicated by them will also indicate the line of collimation of the telescope and be a vertical plane. These sights may be graduated for the purpose of taking angles of elevation. When desired the sights may also be used as "finders," to get the bearings of a mark approximately when the telescope is brought into requisition, to get exactly the direction or bearings of the mark, and to obtain other points or marks in the same vertical plane as the mark "sighted," either on the side of the mark nearest to the observer or on the other or more distant side of said mark. The socket $b$, receiving the end of the staff C, permits the telescope to be swung in a horizontal plane as well as in a vertical plane on its trunnions.

Since the telescope and compass are in fixed relation with each other, the proper adjustment of the latter will always include the like adjustment of the former, by which the operation of my device and the arrangement of parts are as expeditious and easy as with the ordinary plain sight-compass, the complication and delicacy of parts and their adjustment, as in the transit-compasses, are avoided, and an instrument lighter, more compact, less liable to be thrown out of adjustment, and very much more accurate than the ordinary plain sight-compass is produced.

Further, from the fact that the compass can be revolved and the sights folded against the telescope, I am enabled to pack my improved compass in a small space as compared to the ordinary transit-compass. This is quite an important feature of my invention.

The capabilities of my invention, its compactness, its non-liability to be thrown out of adjustment, its lightness, and its very convenient form, when folded, for being carried long distances, and its constant readiness for use, combined with its simplicity and cheapness, mark some of the salient features of my device.

The axial line of the spindle upon which the holder revolves must be at right angles to the axes of the trunnions of the telescope and equidistant from the bearings of said trunnions. The holder must be so constructed that either end of the telescope may freely pass the point of bifurcation in being revolved.

As one means for securing the compass to the telescope, studs I may be projected from the axial arms of the telescope to receive screws $i$ passing through the compass, as shown in Fig. 2, into said studs, as well as into the telescope.

It is no departure from the spirit of my invention to depend the compass from the telescope by means of arms or otherwise, provided they have a fixed relation with each other, as set forth. Nor would it be a departure to raise the compass from the telescope and support the said compass on legs, since the object I have in view in resting the compass directly on the telescope is to get the needle as near as possible to the line of sight through the telescope, to obtain greater stability and compactness.

Having thus described my invention, what I claim, and desire to secure by Letters Patent, is—

1. In a transit-compass, the combination, with a telescope supported in bearings in a suitable holder, of a compass located above, attached to and having a fixed relation with said telescope, substantially as and for the purpose set forth.

2. The combination, with a telescope supported in a suitable holder, of a compass located above, attached to, and having a fixed relation with said telescope, and provided with two or more levers, substantially as and for the purpose set forth.

3. In a surveying-instrument, a compass having the levels arranged thereon for the purpose set forth, in combination with and attached to a telescope, substantially as described.

4. The combination, with the telescope provided with a compass and the trunnions, as shown, of the bifurcated holder having the socket $b$, substantially as shown and described.

5. The combination, with a telescope provided with a compass and the trunnions, of a bifurcated holder adapted to support the telescope, as and for the purpose set forth.

6. The combination, with a telescope provided with a compass and the trunnions, of the bifurcated holder having the set-screw, substantially as and for the purpose set forth.

7. The combination, with the telescope provided with a compass and the trunnions, of the swinging bifurcated holder and the hinged sights, said sights secured to the under surface of said telescope, substantially as and for the purpose set forth.

8. The combination, with a telescope provided with a compass having the levels as shown, of a pair of sights secured to the under surface of said telescope, substantially as and for the purpose set forth.

In testimony whereof I affix my signature in presence of two witnesses.

ARTHUR W. ELKINS.

Witnesses:
C. D. FRASER,
N. A. MOREHOUSE.